US008705542B2

(12) United States Patent
Gerö et al.

(10) Patent No.: US 8,705,542 B2
(45) Date of Patent: Apr. 22, 2014

(54) L2 METHOD FOR PARTIAL VLAN SERVICE MIGRATION

(75) Inventors: Balázs Peter Gerö, Budapest (HU); János Farkas, Kecskemét (HU); Panagiotis Saltsidis, Stockholm (SE); Sriganesh Kini, Fremont, CA (US)

(73) Assignee: Telfonaktiebolaget LM Ericsson (Publ), Stockholm (SE)

( * ) Notice: Subject to any disclaimer, the term of this patent is extended or adjusted under 35 U.S.C. 154(b) by 534 days.

(21) Appl. No.: 12/973,987

(22) Filed: Dec. 21, 2010

(65) Prior Publication Data

US 2011/0310904 A1      Dec. 22, 2011

Related U.S. Application Data

(60) Provisional application No. 61/355,606, filed on Jun. 17, 2010.

(51) Int. Cl.
*H04L 12/28* (2006.01)
(52) U.S. Cl.
USPC ........................ 370/401; 370/395.53; 370/389
(58) Field of Classification Search
USPC ................. 370/392, 256–312, 389, 390, 393, 370/395.53, 395.55, 401–432; 709/223–245
See application file for complete search history.

(56) References Cited

U.S. PATENT DOCUMENTS

2010/0271980 A1* 10/2010 Kini et al. .................... 370/256
2012/0106553 A1*  5/2012 Melman et al. .............. 370/392

OTHER PUBLICATIONS

Virtual Bridged Local Area Networks. IEEE Standard for Local and Metropolitan Area Networks. IEEE Computer Society. IEEE Std 802.1Q-2005. New York, NY, USA May 19, 2006.
Virtual Bridged Local Area Networks. Amendment 4: Provider Bridges. IEEE Computer Society IEEE Std 802.1Qad-2005. New York, NY, USA. May 26, 2006.
Virtual Bridged Local Area Networks. Amendment 7: Provider Backbone Bridges. IEEE Computer Society. IEEE Std 802.1Qah-2008. New York, NY, USA. Aug. 14, 2008.
Virtual Bridged Local Area Networks. Amendment 10: Provider Backbone Bridge Traffic Engineering. IEEE Computer Society. IEEE Std 802.1Qay-2009. New York. NY, USA. Aug. 5, 2009.
Rosen, E. et al. Mutliprotocol Label Switching Architectures. The Internet Society. Internet Engineering Task Force. Network Working Group. Request for Comments: 3031. Jan. 2001.
Lasserre, V. et al. Virtual Private LAN Service (VPLS) Using Label Distribution Protocol (LDP) Signaling. The Internet Society. Internet Engineering Task Force. Network Working Group. Request for Comments: 4762, Jan. 2007.
Migration to Ethernet-Based DSL Aggregation. Technical Report, DSL Forum TR-101. Architecture and Transport Working Group. Apr. 2006.
Haddock: "E-Tree Support in 802.1Q, version 1". Jan. 21, 2010. 802.1 Interim. Austin, Texas.

* cited by examiner

*Primary Examiner* — Man Phan
*Assistant Examiner* — Mandish Randhawa (57) ABSTRACT

An upgraded edge node (e.g., enhanced PBB edge node, enhanced IP/MPLS edge node) and a method are described herein for providing a VLAN service for a customer in a metro network. In addition, a metro network is described herein which includes the upgraded edge nodes, traditional PB edge nodes, and a PB domain that has PB core nodes located therein.

28 Claims, 9 Drawing Sheets

L2 METHOD FOR PARTIAL VLAN SERVICE MIGRATION

CLAIMING BENEFIT OF PRIOR FILED U.S. APPLICATION

This application claims the benefit of U.S. Provisional Application Ser. No. 61/355,606 entitled "L2 Method for Partial VLAN Service Migration" filed on Jun. 17, 2010. The contents of this document are hereby incorporated by reference herein.

TECHNICAL FIELD

The present invention relates to an upgraded edge node (e.g., upgraded PBB edge node, upgraded IP/MPLS edge node) and a method for providing a VLAN service for a customer in a metro network. In addition, the present invention relates to a metro network which includes upgraded edge nodes, traditional PB edge nodes, and a PB domain that has PB core nodes located therein.

BACKGROUND

The following abbreviations are herewith defined, at least some of which are referred to within the following description about the prior art and the present invention.
ARP Address Resolution Protocol
BEB Provider Backbone Edge Bridge
B-MAC Backbone MAC address
B-VID Backbone VLAN Identifier
CNP Customer Network Port
FDB Forwarding Database
IP Internet Protocol
I-SID Backbone Service Instance Identifier
L2 Layer 2 (data link layer)
L3 Layer 3 (network layer)
MAC Medium Access Control
MPLS Multiprotocol Label Switching
PB Provider Bridging
PBB Provider Backbone Bridging
PBB-TE Provider Backbone Bridge Traffic Engineering
PEB Provider Edge Bridge
PIP Provider Instance Port
PNP Provider Network Port
PVID Port VLAN Identifier
PWE3 Pseudowire Emulation Edge to Edge
SPB Shortest Path Bridging
TDM Time-Division Multiplexing
VID VLAN Identifier
VLAN Virtual Local Area Network
VPLS Virtual private LAN service Provider Bridging is the bridging technology deployed today in metro networks (see reference no. 1). A provider may decide to deploy IP/MPLS in its metro network to create the same network environment for services in the metro network as are available in the core network (i.e. the core network is IP/MPLS) to provide standardized L3 or emulated TDM services and at the same time to overcome PB network scalability issues (see reference no. 2). IP/MPLS deployments start with adding IP/MPLS PE nodes as edge nodes to the existing PB metro network. At this stage, IP/MPLS PE nodes are L2 connected by the existing PB transport. The provider may also decide to move its VLAN services to VPLS using the newly deployed IP/MPLS PE nodes (see reference no. 3). This is needed to allow the phasing out of old PB equipment. IP/MPLS PE node deployment is done gradually. Alternatively, the provider may decide to upgrade its PB metro network to provide Provider Backbone Bridging (PBB) (see reference no. 4). PBB overcomes the scalability issues of PB and allows the use of advanced control protocols, such as SPB or PBB-TE. Upgrading a PB edge bridge with PBB functionality is done on a per port basis. After each port upgrade, the provider selects some of its VLAN services to migrate to PBB.

Figure 1:
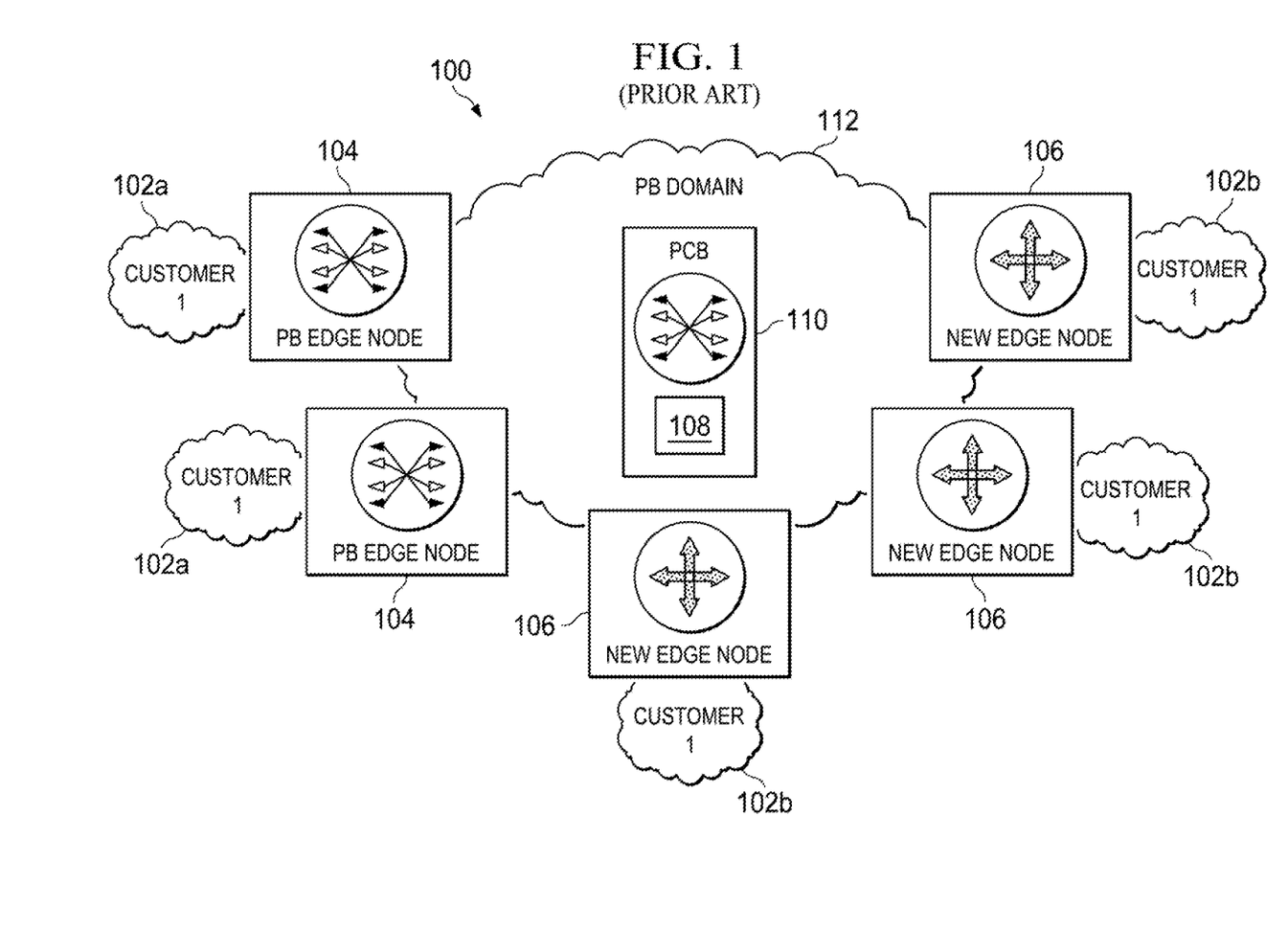
FIG. 1 (PRIOR ART) illustrates an exemplary metro network that depicts when a VLAN service may be migrated to new technology, i.e. either to VPLS or to PBB, at a stage when some customer sites involved in the VLAN service are still connected to PB edge bridges and other customer sites of the same VLAN service are connected to new technology VPLS edge node or PBB edge nodes.

Referring to FIG. 1 (PRIOR ART), there is illustrated an exemplary metro network 100 that depicts when a VLAN service may be migrated to the new technology, i.e. either to VPLS or to PBB, at a stage when some customer sites 102a involved in the VLAN service are still connected to PB edge bridges 104 and other customer sites 102b (related to customer sites 102a) of the same VLAN service are connected to new technology, i.e. VPLS or PBB, edge nodes 106. The motivation to migrate a VLAN service is to reduce the size of a MAC table 108 in PB core bridges 110 (only one shown) located in a PB domain 112 to a larger extent than is possible without the migration of the VLAN services. To provide a VLAN service with edge nodes of different technologies, i.e. either with PB and VPLS or with PB and PBB, coordination is needed between the different technologies and enhanced functionality is needed in the edge nodes of the new technology, i.e. in IP/MPLS PE nodes or in PBB edge bridges. The existing solution for enhancing the functionality in these new technology edge nodes utilizes ARP requests and unknown MAC frame filtering. However, the ARP request and unknown frame filtering method has several problems as follows:
  Not transparent to customers
    The customer perceives outages regularly
    The customer may receive duplicate frames
  An inter layer solution
    The solution is not a pure Layer 2 solution
    The solution is IPv4 specific and not defined for IPv6
    The duration of the outage caused by the method depends on host settings
    Retransmission of lost frames is done by the hosts Accordingly, there has been and is a need to address the aforementioned shortcoming and other shortcomings associated with the prior art to effectively provide a VLAN service in a mixed metro network where the edge nodes include PB edge bridges and PBB edge nodes or IP/MPLS edge nodes. This need and other needs have been satisfied by the present invention.

SUMMARY

A method, an upgraded edge node (e.g., upgraded PBB edge node, upgraded IP/MPLS edge node), and a metro network have been described in the independent claims of the present application. Advantageous embodiments of the method, the upgraded edge node (e.g., upgraded PBB edge node, upgraded IP/MPLS edge node), and the metro network have been described in the associated dependent claims.

In an aspect, the present invention includes a method for providing a VLAN service for a customer in a metro network which includes a plurality of PB edge nodes, a plurality of upgraded edge nodes, and a PB domain with a plurality of PB core nodes located therein. The method comprises the steps of: (a) providing a first connectivity (multipoint connectivity) within the PB domain that spans all of the upgraded edge nodes involved in the VLAN service, wherein the upgraded edge nodes by forwarding frames from the customer on the first connectivity will not result in MAC addresses associated with the frames from being learned by the PB core nodes within the PB domain; (b) providing a second connectivity (rooted multipoint connectivity) within the PB domain that spans all of the PB edge nodes and the upgraded edge nodes involved in the VLAN service, wherein the upgraded edge nodes forward only known frames from the customer, and wherein the upgraded edge nodes by forwarding the known frames from the customer on the second connectivity will result in MAC addresses associated with the known frames being learned by at least a portion of the PB core nodes within the PB domain; and (c) providing a third connectivity (point-to-point connectivity, unidirectional rooted multipoint connectivity) within the PB domain that spans all pairs of the PB edge nodes and the upgraded edge nodes involved in the VLAN service, wherein the PB edge nodes do not forward frames from the customer on the third connectivity, wherein the upgraded edge nodes forward replicated unknown and broadcast frames from the customer on the third connectivity, and wherein the upgraded edge nodes by forwarding the replicated unknown and broadcast frames from the customer on the third connectivity will not result in MAC addresses associated with the replicated unknown and broadcast frames being learned by the PB core nodes within the PB domain. The method has an advantage in that it effectively reduces the size of a MAC table in the PB core nodes.

In another aspect, the present invention includes an upgraded edge node for providing a VLAN service for a customer in a metro network which includes a plurality of PB edge nodes, a plurality of other similar upgraded edge nodes, and a PB domain with a plurality of PB core nodes located therein. The upgraded edge node comprises: (a) a customer facing port adapted to receive a frame from the customer and to translate a VLAN identifier of the frame based on separate ingress and egress VLAN translation tables; (b) a MAC relay adapted to receive the frame from the customer facing port and to determine whether or not the frame is known, wherein if the frame is known then the frame is forwarded to either a first connectivity (multipoint connectivity) or a second connectivity (rooted multipoint connectivity), and wherein if the frame is not known then the frame is replicated and forwarded to the first connectivity (multipoint connectivity) and a third connectivity (point-to-point connectivity, unidirectional rooted multipoint connectivity); (c) a plurality of logical ports, where at least one of the logical ports is adapted to translate a VID of the frame received from the MAC relay using an egress VID translation table and to output the frame on either the first connectivity, the second connectivity or the third connectivity into the PB domain; (d) wherein the first connectivity is within the PB domain and spans all of the other similar upgraded edge nodes involved in the VLAN service; (e) wherein the second connectivity is within the PB domain and spans all of the PB edge nodes and the other similar upgraded edge nodes involved in the VLAN service; and (f) wherein the third connectivity is within the PB domain and spans all pairs of the PB edge nodes and the upgraded edge nodes involved in the VLAN service. The upgraded edge node has an advantage in that it effectively reduces the size of a MAC table in the PB core nodes.

In yet another aspect, the present invention provides a metro network for providing a VLAN service for a customer. The metro network comprises: (a) a plurality of PB edge nodes; (b) a plurality of upgraded edge nodes; (c) a PB domain with a plurality of PB core nodes located therein; (d) wherein the PB domain provides a first connectivity within the PB domain that spans all of the upgraded edge nodes involved in the VLAN service; (e) wherein the PB domain provides a second connectivity that spans all of the PB edge nodes and the upgraded edge nodes involved in the VLAN service; and (f) wherein the PB domain provides a third connectivity that spans all pairs of the PB edge nodes and the upgraded edge nodes involved in the VLAN service. The metro network has an advantage in that it effectively reduces the size of a MAC table in the PB core nodes.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 2:
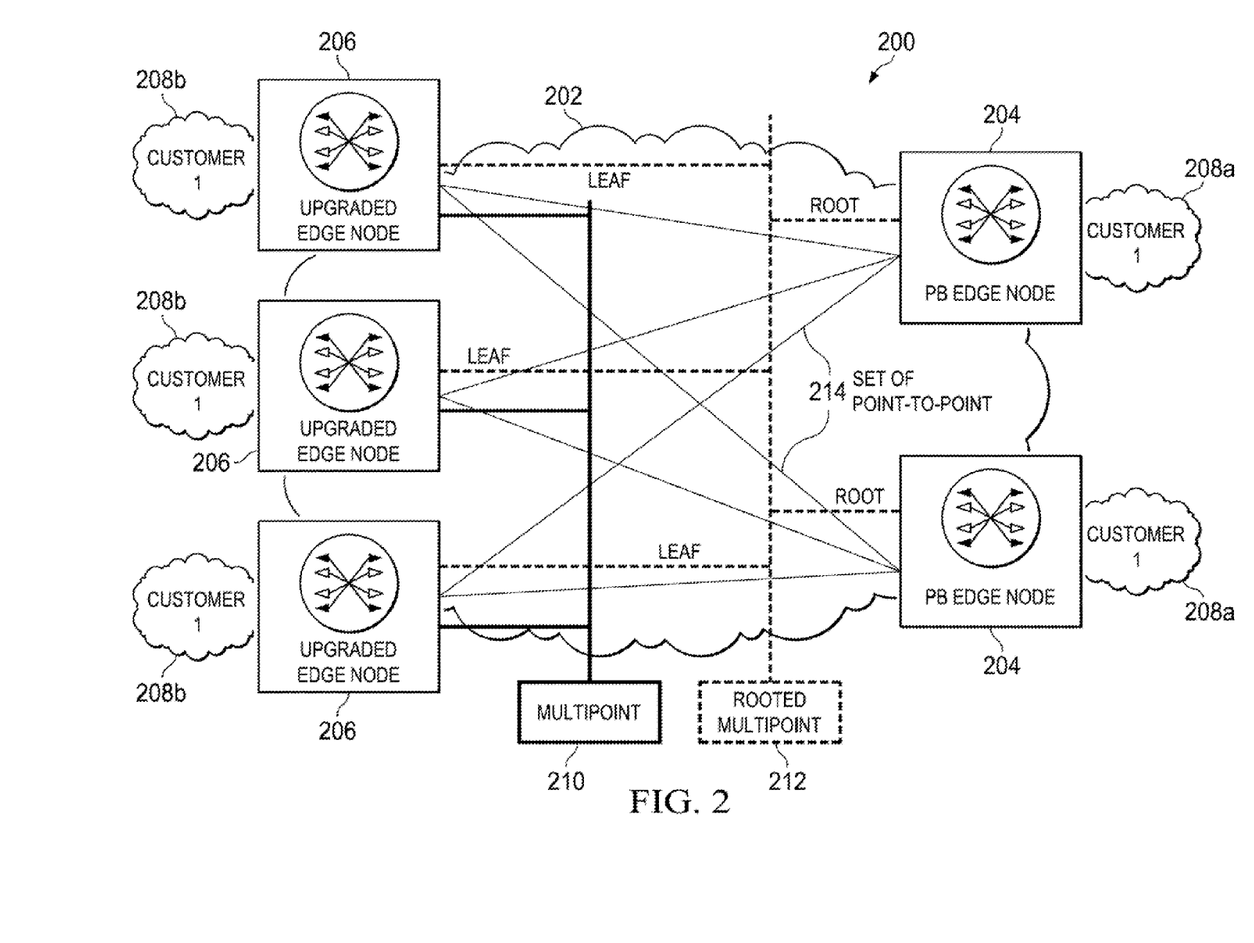
FIG. 2 illustrates an exemplary metro network which is configured to provide a VLAN service for a customer in accordance with an embodiment of the present invention.

Referring to FIG. 2, there is shown an exemplary metro network 200 configured to provide a VLAN service for a customer (customer 1) in accordance with an embodiment of the present invention. The metro network 200 has a PB domain 202 which includes a number of interconnected PB core nodes (not shown) and attached thereto multiple edge nodes including traditional PB edge bridges 204 and upgraded edge nodes 206 (e.g., upgraded PBB edge nodes 206', or upgraded IP/MPLS edge nodes 206"). In this example, the customer (customer 1) has two customer sites 208a attached to two PB edge nodes 204 and three customer sites 208b attached to three upgraded edge nodes 206. If desired, the customer 1 can have any number of customer sites 208a and 208b attached to any number of PB edge nodes 204 and upgraded edge nodes 206. Plus, there can be any number of customers each with their own VLAN service. Furthermore, the metro network 200 includes many components which are well known to those skilled in the art but for clarity the well known components have not been described herein instead only the components needed to describe and enable the present invention have been described herein.

In accordance with the present invention, the metro network 200 is able to provide (or emulate) a VLAN service for customer 1 by providing three connectivity structures 210, 212 and 214 and by providing functional enhancements to the upgraded edge nodes 204. In one embodiment, the metro network 200 provides the VLAN service for customer 1 by providing a multipoint connectivity 210 (first connectivity 210), a rooted multipoint in connectivity 212 (second connectivity 212), and a set of point-to-point connectivity 214 (third connectivity). The three connectivity structures 210, 212 and 214 are as follows:

I. The multipoint connectivity 210 spans all upgraded edge nodes 206 involved in the VLAN service for customer 1 and it is provided by the new technology, i.e. PBB or VPLS. The frames traversing the multipoint connectivity 210 are B-MAC, I-SID and B-VID encapsulated by upgraded PBB nodes 206' (see FIG. 7) or are put onto a VPLS, i.e. on pseudowires by upgraded IP/MPLS edge nodes 206" (see FIG. 8).

II. The rooted multipoint connectivity 212 spans all edge nodes 204 and 206 involved in the VLAN service and it is provided by the PB technology, i.e. frames are Q in Q encapsulated. The PB edge nodes 204 are the roots and the upgraded edge nodes 206 are the leaves. The upgraded edge nodes 206 forward only known frames, i.e. frames with a corresponding dynamic filtering entry in the edge node's FDB (not shown), to the rooted multipoint connectivity 212. The upgraded edge nodes 206 require functional enhancements to be able to forward only known frames to the rooted multipoint connectivity 212 (see discussion related to FIG. 5).

III. The set of point-to-point connectivity 214 is set up between all pairs of PB edge nodes 204 and upgraded edge nodes 206 and they are provided by the PB technology. The PB edge nodes 204 do not forward frames to any point-to-point connectivity 214. The upgraded edge nodes 206 forward and replicate unknown and broadcast frames to the attached point-to-point connectivity 214. The upgraded edge nodes 206 require functional enhancements to forward and replicate unknown and broadcast frames to all attached point-to-point connectivity 214 (see discussion related to FIG. 4).

The PB edge nodes 204 and the upgraded edge nodes 206 implement split horizon between the three connectivity structures 210, 212, and 214. The split horizon is implemented to ensure that the VLAN service is loop free and that there are no duplicate frames. The upgraded PBB edge nodes 206 require functional enhancements to implement split horizon (see discussion related to FIG. 6). The upgraded IP/MPLS edge nodes 206 implement split horizon by default since the split horizon capability is part of the VPLS standard (see reference no. 3). The PB edge nodes 204 can implement split horizon because the PB edge node 204 only forwards frames to a single connectivity structure, the rooted multipoint connectivity 212.

Upon implementing the three connectivity structures 210, 212 and 214 and the upgraded edge nodes 206, the metro network 200 has the resulting behavior in that when the upgraded edge nodes 206 forward frames on the multipoint connectivity 210 then the MAC addresses after MAC learning will not be learnt in the PB domain 202 (by the PB core nodes) because the upgraded edge nodes 206 apply a full header encapsulation on those frames. This means that frames forwarded on the multipoint connectivity 210 by the upgraded edge nodes 206 are always encapsulated either with a PBB header or in the case of IP/MPLS labeled with PWE3 and MPLS labels and each resulting labeled frame is put into another Ethernet frame. In this way, the metro network 200 (Ethernet network 200) will not see customer space MAC addresses at all on the multipoint connectivity 210. On the other hand, when the upgraded edge nodes 206 forward frames on the rooted multipoint connectivity 212 then the MAC addresses after MAC learning are learnt by the PB domain 202 (PB core nodes). This is because the frames that are forwarded on the rooted multipoint connectivity 212 are standard PB frames and thus they contain customer space MAC addresses which are learnt otherwise the host cannot communicate. Finally, enhanced filtering is enabled in all of the PB core nodes to prevent them from learning MAC addresses associated with frames forwarded by the upgraded edge nodes 206 on the point-to-point connectivity structure 214 (see reference no. 7 for discussion about enhance filtering).

Alternative Embodiment

There are switches that support disabling MAC learning for specific VIDs. This capability is required by the Broadband Forum (see reference no. 5). If the metro network 200 supports the disabling of MAC learning for specific VIDs, then the set of point-to-point connectivity 214 defined above can be replaced by a unidirectional rooted multipoint connectivity 214' where the upgraded edge nodes 206 are the leaves and the PB edge nodes 204 are the roots. The "unidirectional" in the unidirectional rooted multipoint connectivity 214' means that frames are only forwarded from the upgraded edge nodes 206 (leaves) to the PB edge nodes 204 (roots).

Figure 3:
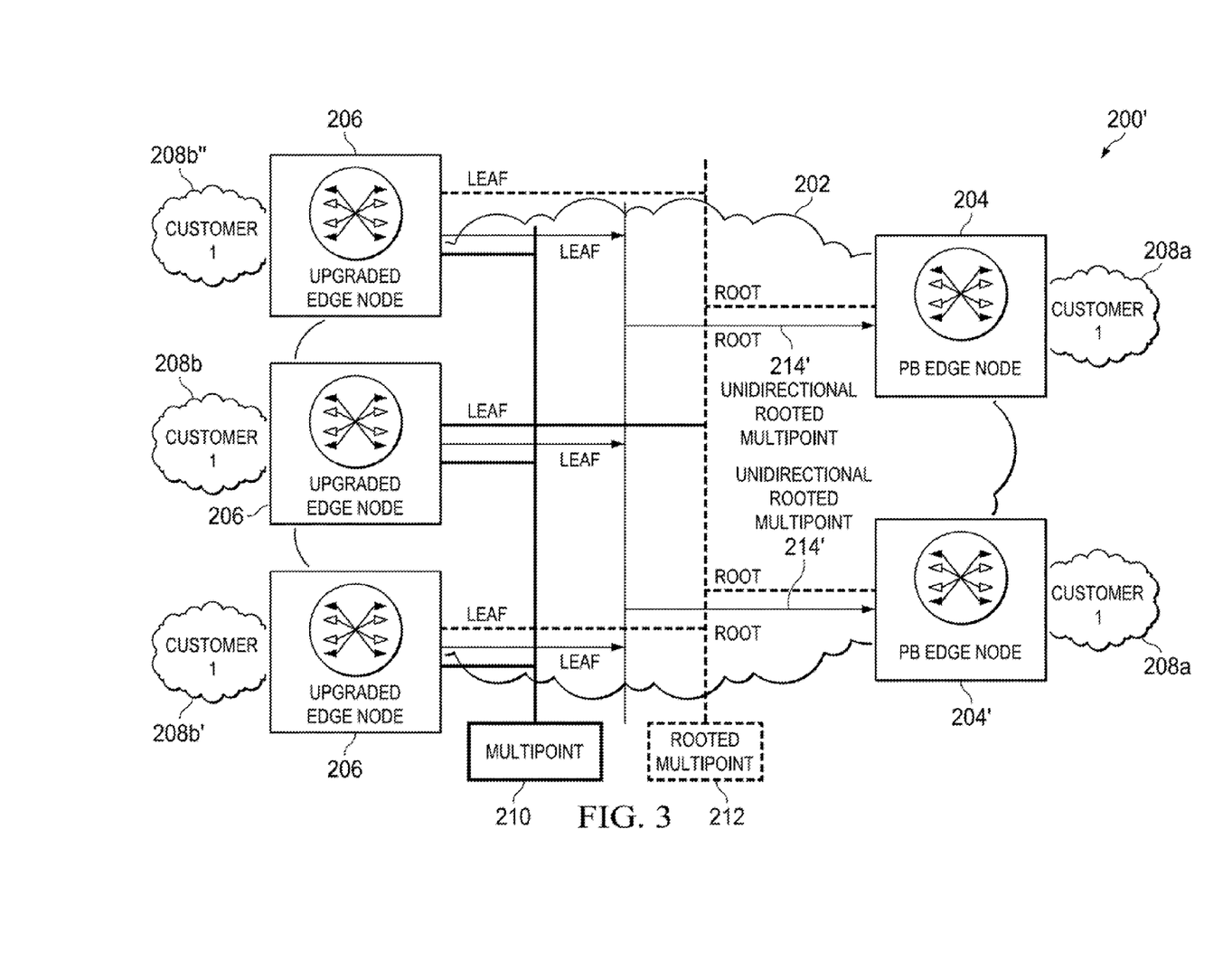
FIG. 3 illustrates an exemplary metro network which is configured to provide a VLAN service for a customer in accordance with another embodiment of the present invention.

Referring to FIG. 3, there is shown an exemplary metro network 200' configured to provide a VLAN service for a customer (customer 1) in accordance with the alternative embodiment of the present invention. As in the previous embodiment, the metro network 200' has a PB domain 202 which includes a number of interconnected PB core nodes (not shown) and attached thereto multiple edge nodes including traditional PB edge bridges 204 and upgraded edge nodes 206 (e.g., upgraded PBB edge nodes 206', or upgraded IP/MPLS edge nodes 206"). In this example, the customer (customer 1) has two customer sites 208a attached to two PB edge nodes 204 and three customer sites 208b attached to three upgraded edge nodes 206. In contrast to the previous embodiment, the metro network 200' provides the VLAN service for customer 1 by providing the multipoint connectivity 210 (first connectivity 210), the rooted multipoint connectivity 212 (second connectivity 212), and the unidirectional rooted multipoint connectivity 214' (third connectivity). The upgraded edge nodes 206 utilize the same forwarding rules for the unidirectional rooted multipoint connectivity 214' as they used for the set of point-to-point connectivity 214, i.e. broadcast and unknown frames are forwarded to the unidirectional rooted multipoint connectivity 214' by the upgraded edge nodes 206. The MAC learning on the VLAN implementing the unidirectional rooted multipoint connectivity 214' is disabled. Thus, the PB domain 202 (PB core nodes) is prevented from learning the MAC addresses of any of the frames forwarded by the upgraded edge nodes 206 on the unidirectional rooted multipoint connectivity 214'.

Upon implementing the three connectivity structures 210, 212 and 214' and the upgraded edge nodes 206, the metro network 200' would have the resulting behavior assume a host in customer site 208b' (bottom left cloud) communicates with a host in customer site 208b" (upper left cloud) in which case if the frame is known by the upgraded edge bridge 206a this means that the upgraded edge bridge 206a has already received a frame from the other host and is aware that the host is reachable via the multipoint connectivity 210, thus it encapsulates the frame and sends it. If the frame is unknown, then the frame is encapsulated and sent by the upgraded edge node 206a via the multipoint connectivity 210 and the unidirectional rooted multipoint connectivity 214' (without encapsulation). As a result, the PB domain 202 (PB core nodes) will not learn customer MAC addresses for this particular communication. In another example, assume a host in customer site 208b' (bottom left cloud) communicates with a host in customer site 208a' (bottom right cloud) in which case if the frame is known by the upgraded edge node 206a, it will forward the frame to the rooted multipoint connectivity 212 (without encapsulation) and the PB domain 202 (PB core nodes) will learn the MAC address. As a result, all MAC addresses that are needed for communication between hosts from customer sites 208b (left clouds) and customer sites 206a (right clouds) will be learnt by the PB core nodes and the MAC addresses involved only in communication between hosts in customer sites 206b (left clouds) are not learnt. In this way, the size of the MAC tables in the PB core nodes is less than would be the case without the present invention.

Functional Enhancements to Upgraded Edge Nodes

As discussed above, the upgraded edge node 206 is either an upgraded PBB edge node 206' or an upgraded IP/MPLS (VPLS) edge node 206". In the upgraded PBB edge nodes 206' functional enhancements are provided to implement VLAN separation of frames with known and with unknown or broadcast destination addresses, to implement split horizon rules and to be able to map a customer service to more than one connectivity structure 210, 212, 214, and 214'. In the upgraded IP/MPLS edge nodes 206" functional enhancements are provided to implement VLAN separation of frames with known and with unknown or broadcast destination addresses and to be able to map a customer service to more than a single S-VID (which is the same as mapping a customer service to more than one connectivity structure). The upgraded IP/MPLS edge nodes 206" per the VPLS standard are able to implement split horizon between logical ports that are represented as pseudowire terminations (see reference no. 6). A detailed discussion about how these functional enhancements are provided with respect to FIGS. 4-6 and then a detailed discussion about an exemplary upgraded PBB edge node 206' and an exemplary upgraded IP/MPLS edge node 206" which implement these functional enhancements is provided with respect to FIGS. 7-8.

Figure 4:
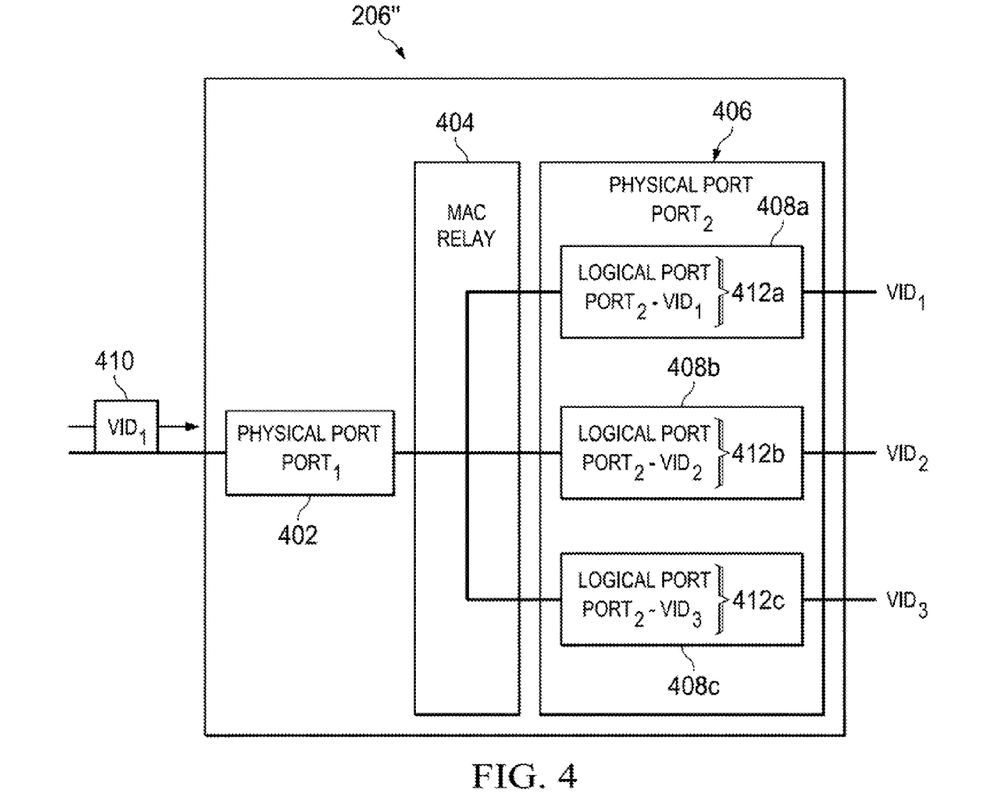
FIGS. 4-6 illustrate how upgraded edge nodes can be provided with functional enhancements so that they can be used in the metro networks shown in FIGS. 2-3 in accordance with an embodiment of the present invention.

In the first enhancement, the upgraded IP/MPLS edge nodes 206" are provided with a functionality to map a customer service to more than a single S-VID. To map a VLAN service onto multiple S-VIDs, the notion of a logical port (logical port) identified by an S-VID is introduced and illustrated in FIG. 4. Referring to FIG. 4, there is an upgraded IP/MPLS edge node 206" that includes a physical port 402 (port$_1$), a MAC relay 404, and a physical port 406 (port$_2$). The physical port 406 includes multiple logical ports 408a, 408b and 408c (three shown). As shown, an ingress frame 410 received at the physical port 402 is mapped to the logical ports 408a, 408b and 408c based on the VID contained in the ingress frame 410. If, untagged frames (not shown) are received at the physical port 402 then they are tagged with the physical port's PVID (see reference no. 6). Each logical port 408a, 408b and 408c has a separate VID translation table 412a, 412b and 412c. This functionality allows the ingress frame 410 which is mapped to separate logical ports 408a, 408b and 408c to be translated to contain the same VID. The MAC relay 404 perceives logical ports 408a, 408b and 408c as if they are different physical ports, i.e. the logical port 408a, 408b and 408c which can be selected by the forwarding process. This means that the logical ports 408a, 408b and 408c appear as individual (physical) ports in the member set and untagged sets of VLANs. The upgraded PBB edge nodes 206' would also be provided with this functionality to map a customer service to more than one connectivity structure 210, 212, 214, and 214'.

Figure 5:
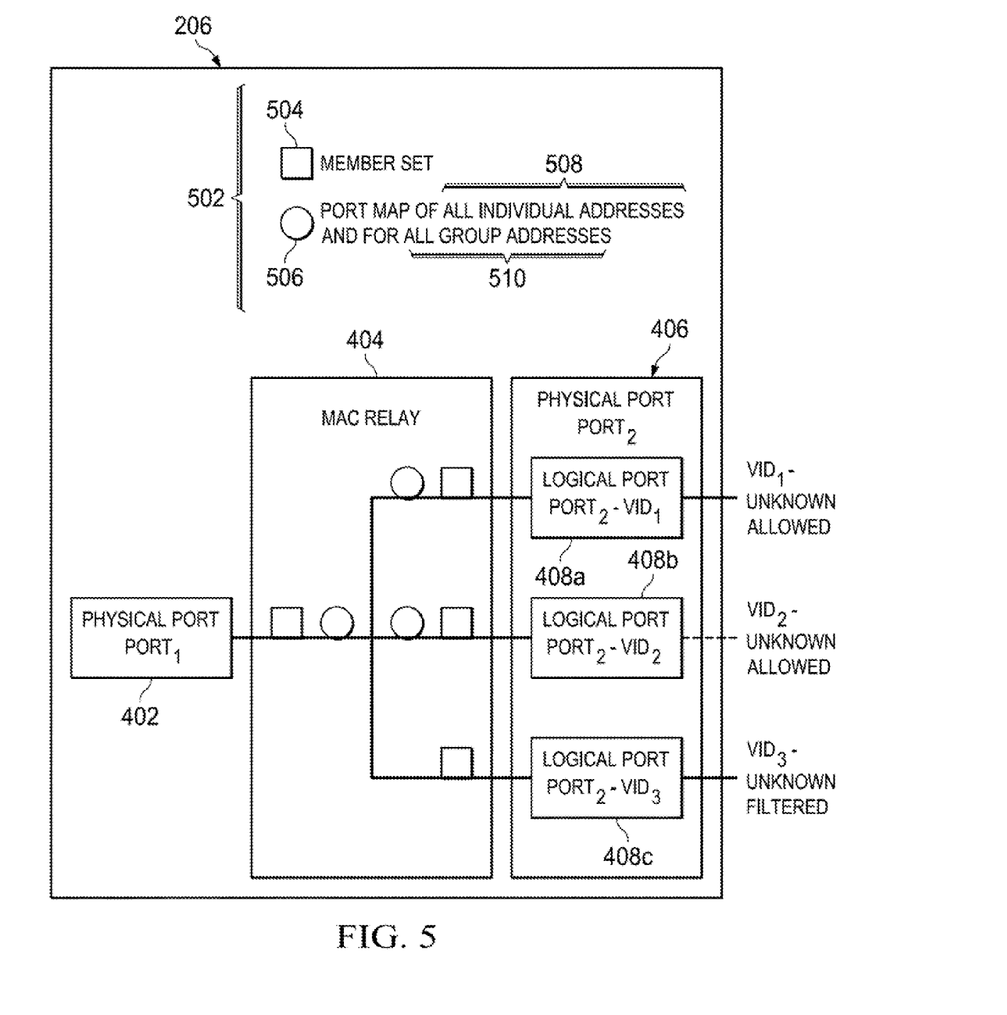

In the second enhancement, the upgraded PBB edge nodes 206' and the upgraded IP/MPLS edge nodes 206" are provided with a functionality that involves the use of static filtering entries to implement VLAN separation of frames with known and with unknown or broadcast destination addresses. Referring to FIG. 5, there is an upgraded edge node 206 (e.g., upgraded PBB edge node 206' and the upgraded IP/MPLS edge node 206") that includes the physical port 402 (port$_1$), the MAC relay 404, the physical port 406 (port$_2$—which includes logical ports 408a, 408b and 408c (three shown)), and static filtering entries 502 (including a member set 504 and a port map 506). The member set 504 is known in the art and defines the ports through which members of that VLAN can be reached. The port map 506 includes a new entry 508 referred to herein as "All Individual Addresses entry for which no more specific Filtering Entry Exists" and a known entry 510 referred to herein as "All Group Addresses for which no more specific Static Filtering exists".

The port map's "All Individual Addresses entry for which no more specific Filtering Entry Exists" entry 508 is created from a known "All Individual Addresses entry for which no more specific Static Filtering Entry Exists" but the word "Static" is left out in the new "All Individual Addresses entry for which no more specific Filtering Entry Exists" entry 508. This was done to ensure compatibility with bridges that enable the MAC learning, i.e. the All Individual Addresses entry 508 represents individual MAC addresses for which neither more specific static nor more specific dynamic entry exist. Furthermore, the "All Individual Addresses entry for which no more specific Filtering Entry Exists" entry 508 is configured with the port map 506 which contains all the logical ports 408a, 408b and 408c that connect to the point-to-point connectivity 214 (or unidirectional rooted multipoint connectivity 214') which is dedicated to unknown and broadcast frames. The "All Group Addresses, for which no more specific Static Filtering Entry exists" entry 510 is configured with the port map 506 which contains all the logical ports 408a, 408b and 408c that connect to the point-to-point connectivity 214 (or unidirectional rooted multipoint connectivity 214') which is dedicated to unknown and broadcast frames. The customer facing port 402 is also added to the port map 506. FIG. 5 shows how unknown frame forwarding can be controlled by the port map's "All Individual Addresses entry for which no more specific Filtering Entry Exists" entry 508, i.e, unknown frames will leave on the top and the middle logical ports 408a and 408b to the point-to-point connectivity 214 or the unidirectional rooted multipoint connectivity 214' but the unknown frames will not leave on the bottom logical port 408c.

Figure 6:
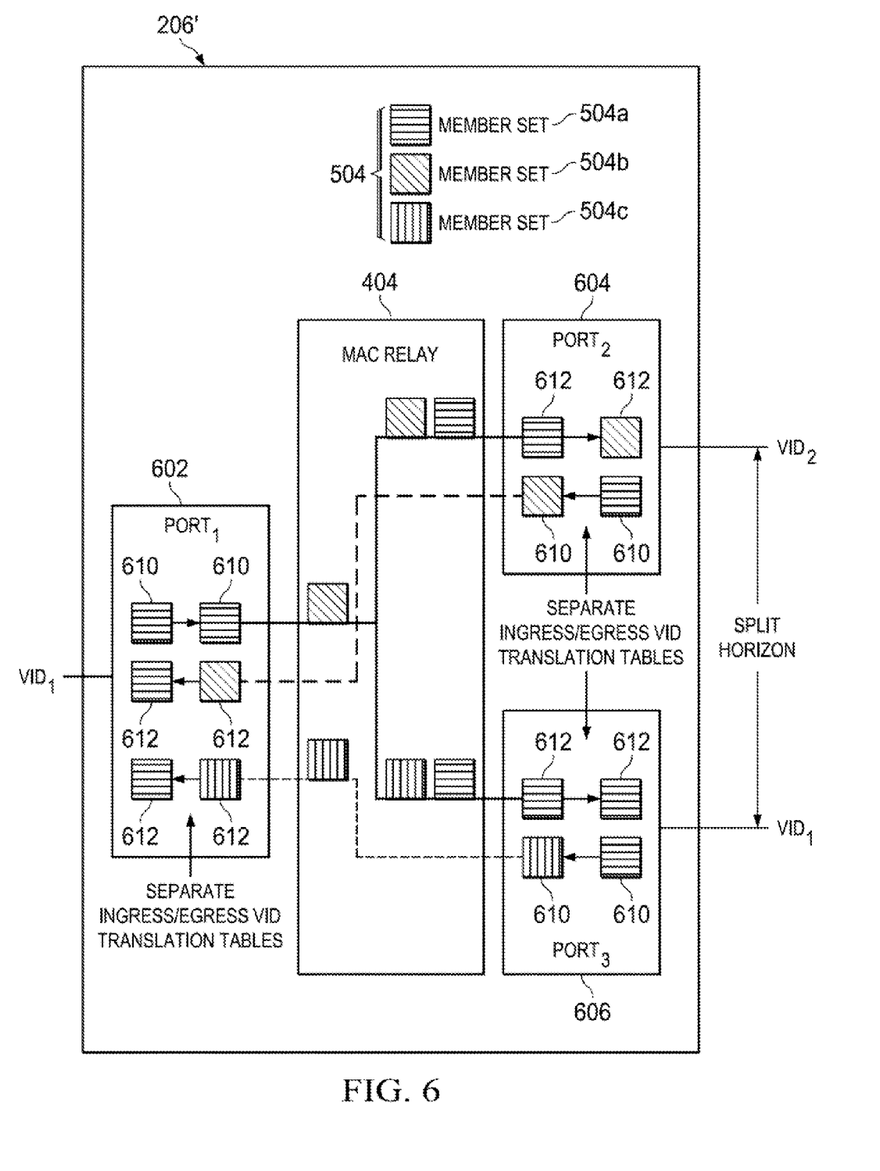

In the third enhancement, the upgraded PBB edge nodes 206' are provided with a functionality to implement split horizon which involves the use of separate ingress VID translation tables and egree VID translation tables. Referring to FIG. 6, there is an upgraded PBB edge node 206' that includes a physical port 602 (port$_1$), a MAC relay 404, a static filter member set 504, a physical port 604 (port$_2$), and a physical port 606 (port$_3$). The physical ports 602, 604 and 606 each have separate ingress VID translation tables 610 and egress VID translation tables 612. The separate ingress and egress VID translation tables 610 and 612 are utilized to support differentiation of frames based on the ingress port. This way frames that arrive with the same VID at different ports can be translated to different (relay) VIDs and the MAC relay 404 is able to forward them differently. The use of different member sets 504a, 504b and 504c configurations based on the ingress port allows the implementing of slit horizon. For example, a frame with VID 504a that enters the upgraded PBB edge node 206' on port 604 is forwarded to port 602 (and never to port 606), because VID 504a is translated on port 604 to VID 504b and port 606 is not included in the member set of VID 504b. Vice versa, a frame with VID 504a that enters the upgraded PBB edge node 206' on port 606 is forwarded to port 602 (and never to port 604), because VID 504a is translated on port 606 to VID 504c and port 602 is not included in the member set of VID 504c. Furthermore, a frame with VID 504a that enters the upgraded PBB edge nodes 206' on port 602 may be forwarded both to port 604 and to port 606, because VID 504a is translated to VID 504b on port 602 and both port 604 and 606 are included in the member set 504b.

Exemplary Upgraded Edge Nodes

Figure 7:
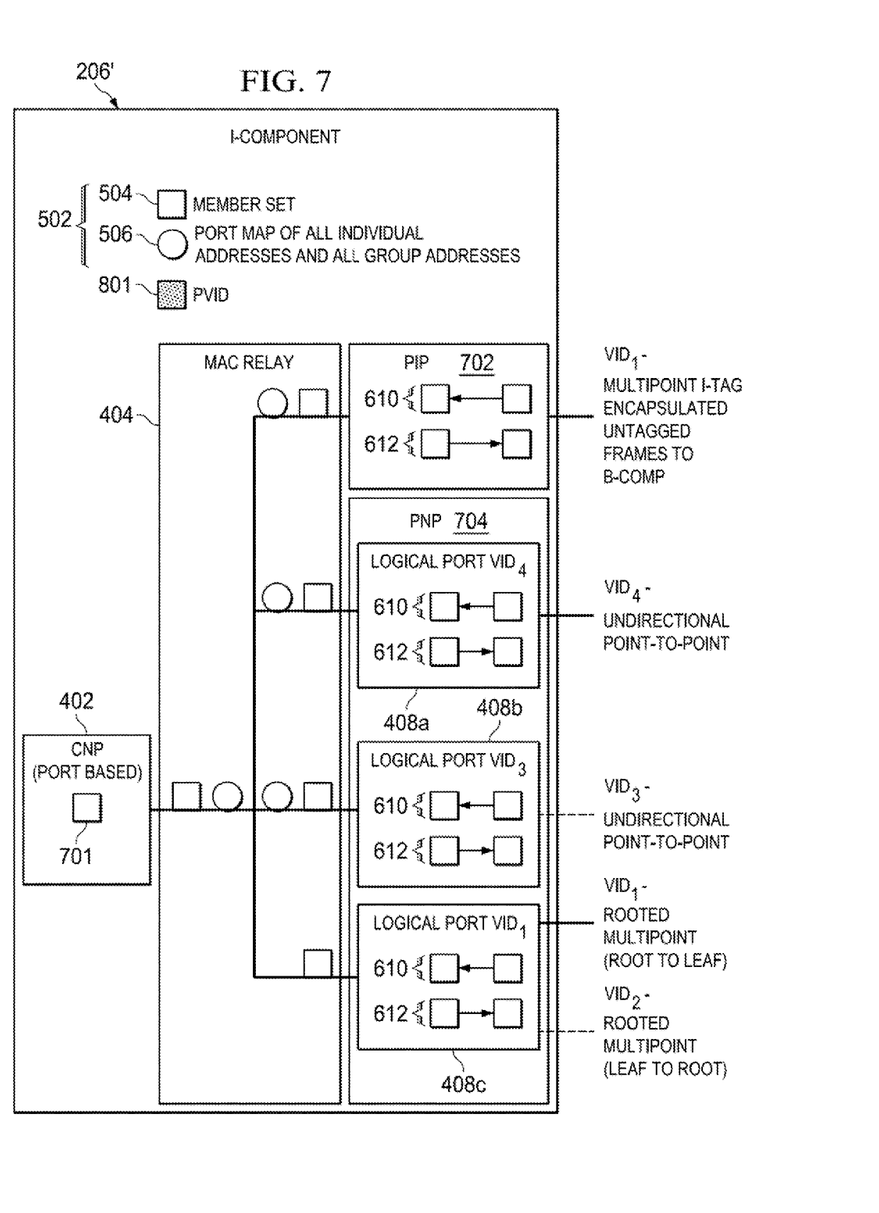
FIG. 7 illustrates an exemplary upgraded PBB edge node in accordance with an embodiment of the present invention.

Referring to FIG. 7, there is illustrated an exemplary upgraded PBB edge node 206' in accordance with an embodiment of the present invention. As shown, the upgraded PBB edge node 206' includes the following I-components: a CNP 402 (including a PVID 701), a MAC relay 404, a PIP port 702 (including separate ingress and egress VID translation tables 610 and 612), a PNP port 704 (including logical ports 408a, 408b and 408c (three shown) each with separate ingress and egress VID translation tables 610 and 612), and static filtering entries 502 (including a member set 504 and a port map 506). The upgraded PBB edge node 206' includes many components which are well known to those skilled in the art but for clarity the well known components have not been described herein instead only the components needed to describe and enable the present invention have been described herein.

In this example, the upgraded PBB edge node 206' is configured to drop incoming frames from the leaf to root part of the rooted multipoint connectivity 212 and the set of unidirectional connectivity 214' because the member set 504 for the corresponding (relay) VIDs are empty. Incoming frames from the multipoint connectivity 210 and the root to leaf part of the rooted multipoint connectivity 212 are mapped to the CNP 402. Split horizon rules are applied to frames that are received on the logical port 408c (logical port $VID_1$) connected to the rooted multipoint connectivity 212, i.e. frames that are received from the root to leaf direction of the rooted multipoint connectivity 212 are not allowed to be forwarded to the PIP port 702 that represents the multipoint connectivity 212. And vice versa, frames that enter the bridge on the PIP port 702 from the multipoint connectivity 212 have to leave on the CNP 402 and are not allowed to be forwarded to the leaf to root part of the rooted multipoint connectivity 212 or to the unidirectional point-to-point connectivity 214'. Customer frames received at the CNP 402 get tagged by the PVID and all provider bound ports 702 and 704 are eligible for forwarding frames. Due to the new port map 506, the unknown or broadcast frames cannot enter the rooted multipoint connectivity 212.

Figure 8:
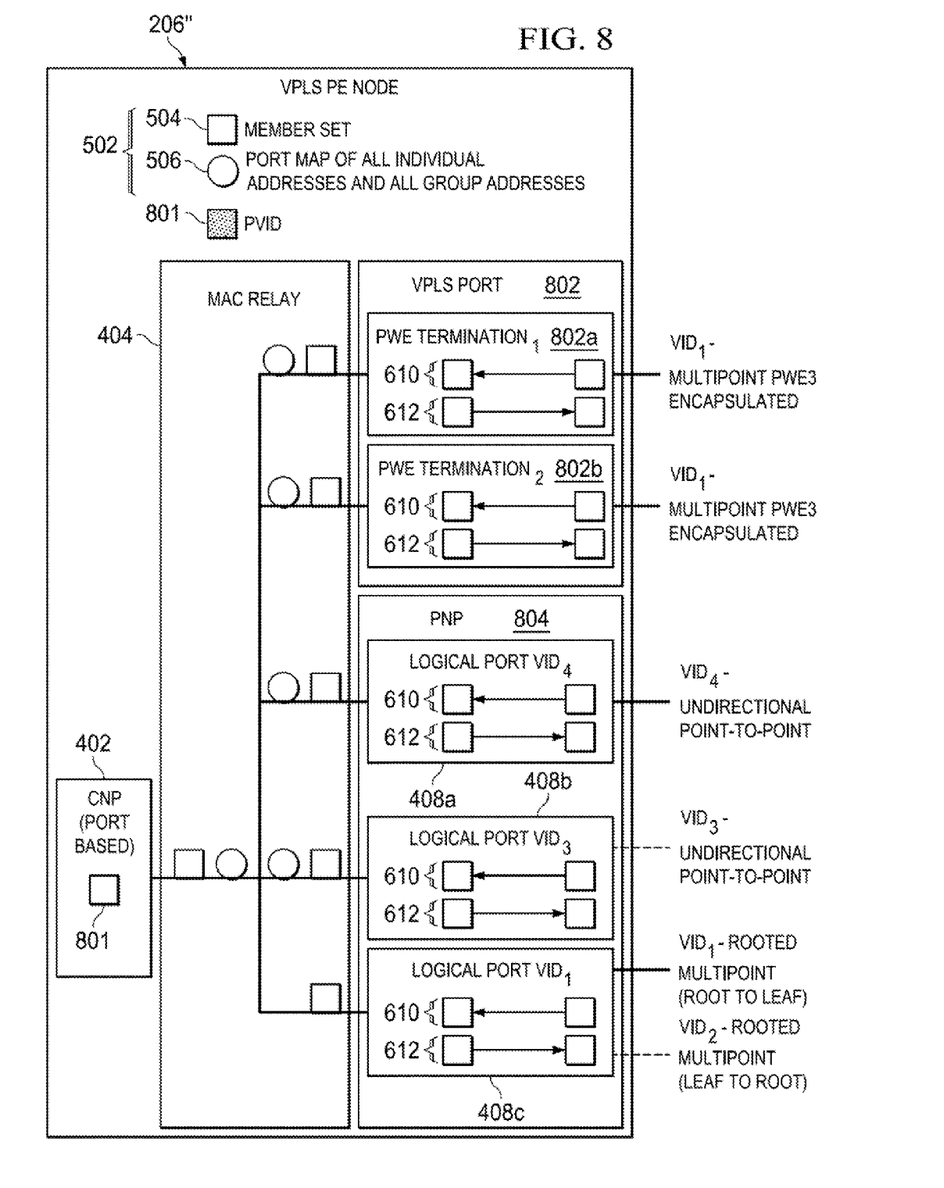
FIG. 8 illustrates an exemplary upgraded IP/MPLS edge node in accordance with an embodiment of the present invention.

Referring to FIG. 8, there is illustrated an exemplary upgraded IP/MPLS edge node 206'' in accordance with an embodiment of the present invention. As shown, the upgraded IP/MPLS edge node 206'' includes the following: a CNP 402 (including a PVID 801), a MAC relay 404, a VPLS port 802 (including PWE3 terminations 802a and 802b (two shown) each with separate ingress and egress VID translation tables 610 and 612), a PNP port 804 (including logical ports 408a, 408b and 408c (three shown) each with separate ingress and egress VID translation tables 610 and 612), and static filtering entries 502 (including a member set 504 and a port map 506). The main difference between the IP/MPLS edge node 206'' when compared to the upgraded PBB edge node 206' is that a VPLS port 802 which terminates the pseudowires is implemented instead of the upgraded PBB edge node's PIP 702. The upgraded IP/MPLS edge node 206'' includes many components which are well known to those skilled in the art but for clarity the well known components have not been described herein instead only the components needed to describe and enable the present invention have been described herein.

In this example, the upgraded IP/MPLS edge node 206'' is configured to drop incoming frames from the leaf to root part of the rooted multipoint connectivity 212 and the set of unidirectional connectivity 214' because the member set 504 for the corresponding (relay) VIDs are empty. Incoming frames from the multipoint connectivity 210 and the root to leaf part of the rooted multipoint connectivity 212 are mapped to the CNP 402. Split horizon rules are applied to frames that are received on the logical port 408c (logical port $VID_1$) connected to the rooted multipoint connectivity 212, i.e. frames that are received from the root to leaf direction of the rooted multipoint connectivity 212 are not allowed to be forwarded to the VPLS port 802 that represents the multipoint connectivity 212. And vice versa, frames that enter the bridge on the VPLS port 802 from the multipoint connectivity 212 have to leave on the CNP 402 and are not allowed to be forwarded to the leaf to root part of the rooted multipoint connectivity 212 or to the unidirectional point-to-point connectivity 214'. Customer frames received at the CNP 402 get tagged by the PVID and all provider bound ports 802 and 804 are eligible for forwarding frames. Due to the new port map 506, unknown or broadcast frames cannot enter the rooted multipoint connectivity 212.

Processing Incoming Customer Frame

Figure 9:
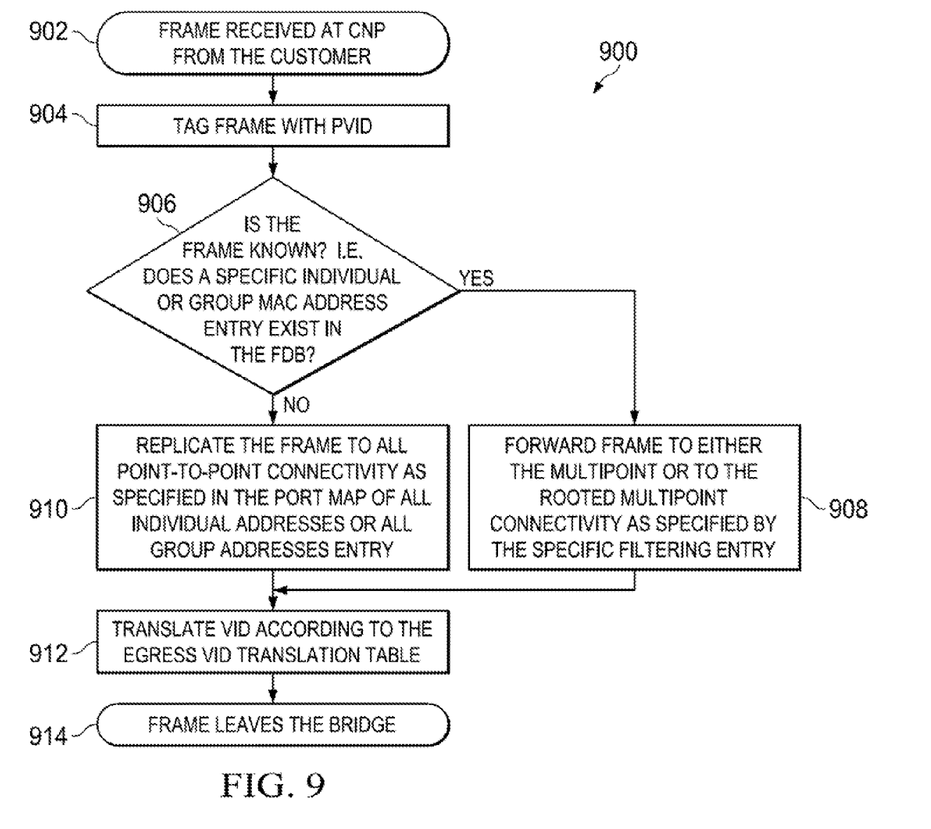
FIG. 9 is a flowchart illustrating the steps of a method implemented by the upgraded edge node shown in FIGS. 8-9 for processing a frame that arrives from the customer in accordance with an embodiment of the present invention.

Referring to FIG. 9 is a flowchart illustrating the steps of a method 900 implemented by the upgraded edge node 206 for processing a frame that arrives from the customer 208b in accordance with an embodiment of the present invention. In step 902, the upgraded edge node's CNP 402 receives a frame from the customer 208b. At step 904, the upgraded edge node's CNP 402 tags the frame with the CNP's PVID. At step 906, the upgraded edge node's MAC relay 404 receives the frame from the CNP 402 and determines whether or not the frame is known (e.g., determine whether frame has a specific individual MAC address or a group MAC address entry that exists in the FDB). If the frame is known in step 906, then the upgraded edge node's MAC relay 404 at step 908 forwards the frame to either the multipoint connectivity 210 or the rooted multipoint connectivity 212 as specified by the static filtering entries 502. If the frame is not known in step 906, then the upgraded edge node's MAC relay 408 at step 910 replicates the frame and forwards the frame to the point-to-point connectivity 214 (or the unidirectional rooted multipoint connectivity 214') as specified in the port map 506 which includes the "All Individual Addresses entry for which no more specific Filtering Entry Exists" entry 508 and the "All Group Addresses for which no more specific Static Filtering exists" entry 510. After steps 908 and 910, the upgraded edge node's output port 702, 704, 802 or 804 at steps 912 and 914 translates a VID of the frame received from the MAC relay 404 using an egress VID translation table 612 and outputs the frame into the PB domain 202.

From the foregoing, one skilled in the art will appreciate that the present invention defines how a VLAN service should be provided in a mixed network environment, i.e. where part of the nodes are PB edge bridges 204 and other nodes are upgraded PBB (or alternatively IP/MPLS) edge nodes 206. The present invention has several advantages some of which are as follows:

- The present invention reduces the MAC table sizes in PB bridges. At any given stage of deployment, the present invention's method allows the provider to migrate more VLAN services than without using the present invention. Thus, the MAC table sizes of PB bridges can be reduced either to a larger extent or the same MAC table size reductions can be achieved with fewer investments, e.g. by fewer new PBB edge nodes (or IP/MPLS edge nodes).
- The more VLAN services that are migrated to the upgraded PBB edge nodes 206' or the upgraded IP/MPLS edge nodes 206", the longer the original PB equipment (e.g., PB edge nodes 204) can be used in the metro network 200, i.e. the PB equipments will run into scalability problems later than they would without the present invention.
- The present invention's method is transparent to customers, i.e. the customer cannot notice that the VLAN service is being provided according to the principles of the present invention. Consequently, the present invention has no drawback from the customer's point of view.
- The added value of using the alternative unidirectional rooted multipoint connectivity 214' described above is the reduced configuration burden, i.e. a single VLAN is used instead of a set of VLANs between all of the pairs of upgraded edge nodes 206 and PB edge nodes 204 which are involved in the VLAN service.

References*

*The contents of reference nos. 1-7 are hereby incorporated herein by reference.

(1) IEEE 802.1ad, IEEE Standard for Local and Metropolitan Area Networks—Virtual Bridged Local Area Networks—Amendment 4: Provider Bridges, 2005.
(2) IETF rfc3031, Multi Protocol Label Switching Architecture, January 2001.
(3) IETF rfc4762, Virtual Private LAN Service (VPLS) Using Label Distribution Protocol (LDP) Signaling, January 2007.
(4) IEEE 802.1ah, IEEE Standard for Local and Metropolitan Area Networks—Virtual Bridged Local Area Networks—Amendment 7: Provider Backbone Bridges, 2008.
(5) BBF TR-101, Migration to Ethernet-Based DSL Aggregation, April 2006.
(6) IEEE 802.1Qay, IEEE Standard for Local and Metropolitan Area Networks—Virtual Bridged Local Area Networks—Amendment 10: Provider Backbone Bridge Traffic Engineering, 2009.
(7) IEEE 802.1Q (2005), IEEE Standard for Local and Metropolitan Area Networks—Virtual Bridged Local Area Networks, 2005.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A method for providing a Virtual Local Area Network (VLAN) service for a customer in a metro network which includes a plurality of Provider Bridging (PB) edge nodes, a plurality of upgraded edge nodes, and a PB domain with a plurality of PB core nodes located therein, the method comprising the steps of:
   providing a first connectivity within the PB domain that spans all of the upgraded edge nodes involved in the VLAN service, wherein the upgraded edge nodes by forwarding frames from the customer on the first connectivity will not result in customer Medium Access Control (MAC) addresses associated with the frames from being learned by the PB core nodes within the PB domain;
   providing a second connectivity within the PB domain that spans all of the PB edge nodes and the upgraded edge nodes involved in the VLAN service, wherein the upgraded edge nodes forward only known frames from the customer, and wherein the upgraded edge nodes by forwarding the known frames from the customer on the second connectivity will result in customer MAC addresses associated with the known frames being learned by at least a portion of the PB core nodes within the PB domain; and
   providing a third connectivity within the PB domain that spans all pairs of the PB edge nodes and the upgraded edge nodes involved in the VLAN service, wherein the PB edge nodes do not forward frames from the customer on the third connectivity, wherein the upgraded edge nodes forward replicated unknown and broadcast frames from the customer on the third connectivity, and wherein the upgraded edge nodes by forwarding the replicated unknown and broadcast frames from the customer on the third connectivity will not result in MAC addresses associated with the replicated unknown and broadcast frames being learned by the PB core nodes within the PB domain.

2. The method of claim 1, wherein if the metro network supports disabling MAC learning for specific Virtual Local Area Network Identifiers (VIDs) then the third connectivity is further defined where the upgraded edge nodes are leaves and the PB edge nodes are roots, wherein the upgraded edge nodes forward frames on the further defined third connectivity to the PB edge nodes, and wherein the PB edge nodes do not forward frames on the further defined third connectivity to the upgraded edge nodes.

3. The method of claim 1, wherein the upgraded edge nodes are Provider Backbone Bridging (PBB) edge nodes that have been enhanced to perform at least the following steps:
   implementing VLAN separation of frames with known and with unknown and broadcast destination MAC addresses;
   implementing split horizon rules to ensure the VLAN service is loop free and that there are no duplicate frames; and
   mapping frames from the customers to more than a single connectivity.

4. The method of claim 3, wherein the step of implementing VLAN separation of frames with known and with unknown and broadcast destination MAC addresses further comprises filtering the frames using a member set and two port maps, wherein the member set defines logical ports through which members of the VLAN service can be reached, wherein the port map specifies to which logical port frames are forwarded based on Virtual Local Area Network Identifiers (VIDs) and destination MACs address of the frames, and wherein one of the port maps includes an all individual addresses entry for which no more specific filtering entry exists and the other port map includes an all group addresses entry for which no more specific static filtering entry exists.

5. The method of claim 3, wherein the step of implementing split horizon rules further comprises introducing ingress VID translation tables and egress VID translations tables such that frames which arrive with same VID can be translated to have different relay VIDs so the frames can be forwarded differently.

6. The method of claim 3, wherein the step of mapping frames from the customer to more than a single connectivity comprises introducing a functionality where logical ports are identified by a Service Virtual Local Area Network Identifier (S-VID) which includes the steps of:
mapping ingress tagged frames on a physical port to logical ports based on a Virtual Local Area Network Identifier (VID) contained in the ingress tagged frames;
tagging ingress untagged frames with a Port VLAN Identifier (PVID) of the physical port; and
providing a separate VID translation table for each physical and logical port which allows the MAC relay to distinguish between frames with the same VID based on a different input physical or logical port.

7. The method of claim 1, wherein the upgraded edge nodes are Internet Protocol/ Multiprotocol Label Switching (IP/MPLS) edge nodes that have been enhanced to perform at least the following steps:
implementing VLAN separation of frames with known and with unknown and broadcast destination MAC addresses; and
mapping frames from the customer to more than a single connectivity.

8. The method of claim 7, wherein the step of implementing VLAN separation of frames with known and with unknown and broadcast destination MAC addresses further comprises filtering the frames using a member set and two port maps, wherein the member set defines logical ports through which members of the VLAN service can be reached, wherein the port map specifies to which logical port frames are forwarded based on Virtual Local Area Network Identifiers (VIDs) and destination MACs address of the frames, and wherein one of the port maps includes an all individual addresses entry for which no more specific filtering entry exists and the other port map includes an all group addresses entry for which no more specific static filtering entry exists.

9. The method of claim 7, wherein the step of mapping frames from the customer to more than a single connectivity comprises introducing a functionality where logical ports are identified by a Service Virtual Local Area Network Identifier (S-VID) which includes the steps of:
mapping ingress tagged frames on a physical port to logical ports based on a Virtual Local Area Network Identifier (VID) contained in the ingress tagged frames;
tagging ingress untagged frames with a Port VLAN Identifier (PVID) of the physical port; and
providing a separate VID translation table for each physical and logical port which allows the MAC relay to distinguish between frames with the same VID based on a different input physical or logical port.

10. An upgraded edge node for providing a Virtual Local Area Network (VLAN) service for a customer in a metro network which includes a plurality of Provider Bridging (PB) edge nodes, a plurality of other similar upgraded edge nodes, and a PB domain with a plurality of PB core nodes located therein, the upgraded edge node comprising:
a customer facing port configured to receive a frame from the customer and to translate a VLAN identifier of the frame based on separate ingress and egress VLAN translation tables;
a Medium Access Control (MAC) relay configured to receive the frame from the port and to determine whether or not the frame is known, wherein if the frame is known then the frame is forwarded to either a first connectivity or a second connectivity, and wherein if the frame is not known then the frame is replicated and forwarded to the first and a third connectivity;
a plurality of logical ports, where at least one of the logical ports is configured to translate a VLAN Identifier (VID) of the frame received from the MAC relay using an egress VID translation table and to output the frame on either the first connectivity, the second connectivity or the third connectivity into the PB domain;
wherein the first connectivity is within the PB domain and spans all of the other similar upgraded edge nodes involved in the VLAN service;
wherein the second connectivity is within the PB domain and spans all of the PB edge nodes and the other similar upgraded edge nodes involved in the VLAN service; and
wherein the third connectivity is within the PB domain and spans all pairs of the PB edge nodes and the upgraded edge nodes involved in the VLAN service.

11. The upgraded edge node of claim 10, wherein the upgraded edge node is a Provider Backbone Bridging (PBB) edge node that has been enhanced to include at least the following functionalities:
implement VLAN separation of frames with known and with unknown and broadcast destination MAC addresses;
implement split horizon rules to ensure the VLAN service is loop free and that there are no duplicate frames; and
map frames from the customer to more than a single connectivity.

12. The upgraded edge node of claim 11, wherein the MAC relay implements the VLAN separation of frames with known and with unknown and broadcast destination MAC addresses by filtering the frame using a member set and port maps, wherein the member set defines the logical ports through which members of the VLAN service can be reached, wherein the port map specifies to which logical port the frame is to be forwarded based on a VID and destination MAC address of the frame, and wherein a port map includes an all individual addresses entry for which no more specific filtering entry exists and another port map includes an all group addresses entry for which no more specific static filtering entry exists.

13. The upgraded edge node of claim 11, wherein the customer facing port and the logical ports implement the split horizon rules by respectively using ingress VID translation tables and egress VID translations tables such that frames which arrive with same VID could be translated to have different relay VIDs so the frames could be forwarded differently.

14. The upgraded edge node of claim 11, wherein the customer facing port, the MAC relay, and the logical ports implement the mapping of frames from the customer to more than a single connectivity by:
mapping ingress tagged frames received at the customer facing port to logical ports based on a Virtual Local Area Network Identifier (VID) contained in the ingress tagged frames;
tagging ingress untagged frames with a Port VLAN identifier (PVID) of the customer facing port; and
providing a separate VID translation table for each logical port which allows the MAC relay to distinguish between frames with the same VID based on a different input physical or logical port.

15. The upgraded edge node of claim 10, wherein the upgraded edge node is an Internet Protocol/ Multiprotocol Label Switching (IP/MPLS) edge node that has been enhanced to include at least the following functionalities:
   implement VLAN separation of frames with known and with unknown and broadcast destination MAC addresses; and
   map frames from the customer to more than a single connectivity.

16. The upgraded edge node of claim 15, wherein the MAC relay implements the VLAN separation of frames with known and with unknown and broadcast destination MAC addresses by filtering the frame using a member set and port maps, wherein the member set defines the logical ports through which members of the VLAN service can be reached, wherein the port map specifies to which logical port the frame is to be forwarded based on a VID and destination MAC address of the frame, and wherein a port map includes an all individual addresses entry for which no more specific filtering entry exists and another port map includes an all group addresses entry for which no more specific static filtering entry exists.

17. The upgraded edge node of claim 15, wherein the customer facing port, the MAC relay, and the logical ports implement the mapping of frames from the customer to more than a single connectivity by:
   mapping ingress tagged frames received at the customer facing port to logical ports based on a Virtual Local Area Network Identifier (VID) contained in the ingress tagged frames;
   tagging ingress untagged frames with a Port VLAN identifier (PVID) of the customer facing port; and
   providing a separate VID translation table for each logical port which allows the MAC relay to distinguish between frames with the same VID based on a different input physical or logical port.

18. A metro network for providing a Virtual Local Area Network (VLAN) service for a customer, the metro network comprising:
   a plurality of Provider Bridging (PB) edge nodes;
   a plurality of upgraded edge nodes;
   a PB domain with a plurality of PB core nodes located therein;
   wherein the PB domain provides a first connectivity within the PB domain that spans all of the upgraded edge nodes involved in the VLAN service, wherein the first connectivity is a multipoint connectivity;
   wherein the PB domain provides a second connectivity that spans all of the PB edge nodes and the upgraded edge nodes involved in the VLAN service, wherein the second connectivity is a rooted multipoint connectivity;
   wherein the PB domain provides a third connectivity that spans all pairs of the PB edge nodes and the upgraded edge nodes involved in the VLAN service, wherein the third connectivity is a set of point-to-point connectivity, or if the metro network supports a disabling of Medium Access Control (MAC) learning for specific Virtual Local Area Network Identifiers (VIDs) then the third connectivity is a unidirectional rooted multipoint connectivity; and
   wherein each upgraded edge node comprises:
   a customer facing port configured to receive a frame from the customer and to translate a VLAN identifier of the frame based on separate ingress and egress VLAN translation tables;
   a Medium Access Control (MAC) relay configured to receive the frame from the customer facing port and to determine whether or not the frame is known, wherein if the frame is known then forward the frame to either the first connectivity or the second connectivity, and wherein if the frame is not known then replicate the frame and forward the frame to the third connectivity; and
   a plurality of logical ports, where at least one of the logical ports configured to translate a VLAN identifier (VID) of the frame received from the MAC relay using an egress VID translation table and to output the frame into the PB domain.

19. The metro network of claim 18, wherein the upgraded edge node is a Provider Backbone Bridging (PBB) edge node that has been enhanced to include at least the following functionalities:
   implement VLAN separation of frames with known and with unknown and broadcast destination MAC addresses;
   implement split horizon rules to ensure the VLAN service is loop free and that there are no duplicate frames; and
   map frames from the customer to more than the single connectivity.

20. The metro network of claim 18, wherein the upgraded edge node is an Internet Protocol/ Multiprotocol Label Switching (IP/MPLS) edge node that has been enhanced to include at least the following functionalities:
   implement VLAN separation of frames with known and with unknown and broadcast destination MAC addresses; and
   map frames from the customer to more than the single connectivity.

21. A method implemented by an upgraded edge node for providing a Virtual Local Area Network (VLAN) service for a customer in a metro network which includes a plurality of Provider Bridging (PB) edge nodes, a plurality of other similar upgraded edge nodes, and a PB domain with a plurality of PB core nodes located therein, the method comprising:
   receiving, by a customer facing port of the upgraded edge node, a frame from the customer and translating, by the customer facing port, a VLAN identifier of the frame based on separate ingress and egress VLAN translation tables;
   receiving, by a Medium Access Control (MAC) relay of the upgraded edge node, the frame from the port and determining, by the MAC relay, whether or not the frame is known, wherein if the frame is known then forwarding, by the MAC relay, the frame to either a first connectivity or a second connectivity, and wherein if the frame is not known then replicating and forwarding, by the MAC relay, to the first and a third connectivity;
   translating, by at least one of a plurality of logical ports of the upgraded edge node, a VLAN Identifier (VID) of the frame received from the MAC relay using an egress VID translation table and outputting, by the at least one of the plurality of logical ports, the frame on either the first connectivity, the second connectivity or the third connectivity into the PB domain;
   wherein the first connectivity is within the PB domain and spans all of the other similar upgraded edge nodes involved in the VLAN service;
   wherein the second connectivity is within the PB domain and spans all of the PB edge nodes and the other similar upgraded edge nodes involved in the VLAN service; and
   wherein the third connectivity is within the PB domain and spans all pairs of the PB edge nodes and the upgraded edge nodes involved in the VLAN service.

22. The method of claim 21, wherein the upgraded edge node is a Provider Backbone Bridging (PBB) edge node that has been enhanced to include at least the following functionalities:
- implement VLAN separation of frames with known and with unknown and broadcast destination MAC addresses;
- implement split horizon rules to ensure the VLAN service is loop free and that there are no duplicate frames; and
- map frames from the customer to more than a single connectivity.

23. The method of claim 22, wherein the MAC relay implements the VLAN separation of frames with known and with unknown and broadcast destination MAC addresses by filtering the frame using a member set and port maps, wherein the member set defines the logical ports through which members of the VLAN service can be reached, wherein the port map specifies to which logical port the frame is to be forwarded based on a VID and destination MAC address of the frame, and wherein a port map includes an all individual addresses entry for which no more specific filtering entry exists and another port map includes an all group addresses entry for which no more specific static filtering entry exists.

24. The method of claim 22, wherein the customer facing port and the logical ports implement the split horizon rules by respectively using ingress VID translation tables and egress VID translations tables such that frames which arrive with same VID could be translated to have different relay VIDs so the frames could be forwarded differently.

25. The method of claim 22, wherein the customer facing port, the MAC relay, and the logical ports implement the mapping of frames from the customer to more than a single connectivity by:
- mapping ingress tagged frames received at the customer facing port to logical ports based on a Virtual Local Area Network Identifier (VID) contained in the ingress tagged frames;
- tagging ingress untagged frames with a Port VLAN identifier (PVID) of the customer facing port; and
- providing a separate VID translation table for each logical port which allows the MAC relay to distinguish between frames with the same VID based one a different input physical or logical port.

26. The method of claim 21, wherein the upgraded edge node is an Internet Protocol/ Multiprotocol Label Switching (IP/MPLS) edge node that has been enhanced to include at least the following functionalities:
- implement VLAN separation of frames with known and with unknown and broadcast destination MAC addresses; and
- map frames from the customer to more than a single connectivity.

27. The method of claim 26, wherein the MAC relay implements the VLAN separation of frames with known and with unknown and broadcast destination MAC addresses by filtering the frame using a member set and port maps, wherein the member set defines the logical ports through which members of the VLAN service can be reached, wherein the port map specifies to which logical port the frame is to be forwarded based on a VID and destination MAC address of the frame, and wherein a port map includes an all individual addresses entry for which no more specific filtering entry exists and another port map includes an all group addresses entry for which no more specific static filtering entry exists.

28. The method of claim 26, wherein the customer facing port, the MAC relay, and the logical ports implement the mapping of frames from the customer to more than a single connectivity by:
- mapping ingress tagged frames received at the customer facing port to logical ports based on a Virtual Local Area Network Identifier (VID) contained in the ingress tagged frames;
- tagging ingress untagged frames with a Port VLAN identifier (PVID) of the customer facing port; and
- providing a separate VID translation table for each logical port which allows the MAC relay to distinguish between frames with the same VID based on a different input physical or logical port.

* * * * *

UNITED STATES PATENT AND TRADEMARK OFFICE
CERTIFICATE OF CORRECTION

PATENT NO.      : 8,705,542 B2  
APPLICATION NO. : 12/973987  
DATED           : April 22, 2014  
INVENTOR(S)     : Gero et al.

It is certified that error appears in the above-identified patent and that said Letters Patent is hereby corrected as shown below:

On the Title Page, Item (73), under "Assignee", in Column 1, Line 1, delete "Telfonaktiebolaget LM Ericsson" and insert -- Telefonaktiebolaget L M Ericsson --, therefor.

In the Specification

In Column 3, Line 26, delete "V LAN" and insert -- VLAN --, therefor.

In Column 4, Line 53, delete "(customer l)" and insert -- (customer 1) --, therefor.

In Column 5, Line 12, delete "multipoint in" and insert -- multipoint --, therefor.

In Column 6, Line 16, delete "teaming" and insert -- learning --, therefor.

In Column 10, Line 22, delete "VID,)" and insert -- $VID_1$) --, therefor.

In the Claims

In Column 18, Line 3, in Claim 25, delete "one" and insert -- on --, therefor.

Signed and Sealed this  
Second Day of September, 2014

Michelle K. Lee  
*Deputy Director of the United States Patent and Trademark Office*